April 3, 1945.   J. E. DUGGAN   2,372,889
SELF-LOCKING NUT STRUCTURE
Filed April 20, 1944   2 Sheets-Sheet 1

INVENTOR.
JAMES EDWARD DUGGAN.
BY
ATTORNEYS

April 3, 1945.　　　　J. E. DUGGAN　　　　2,372,889
SELF-LOCKING NUT STRUCTURE
Filed April 20, 1944　　　2 Sheets-Sheet 2
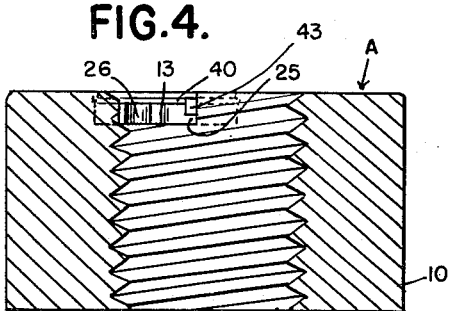
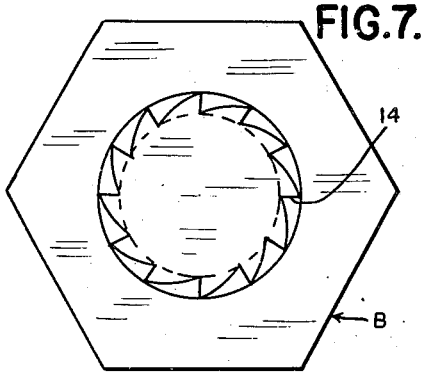
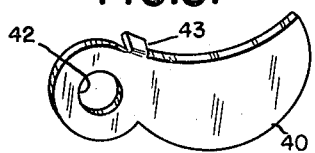
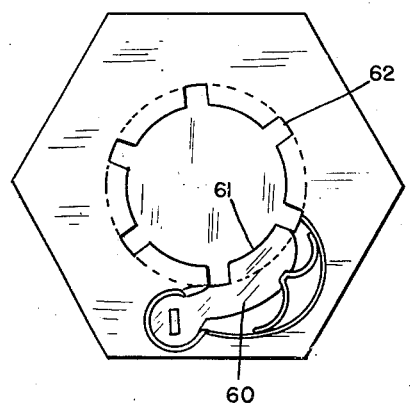
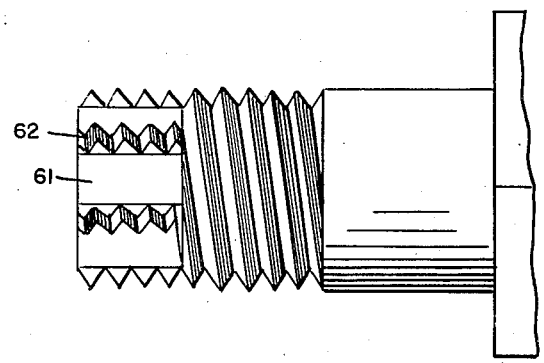
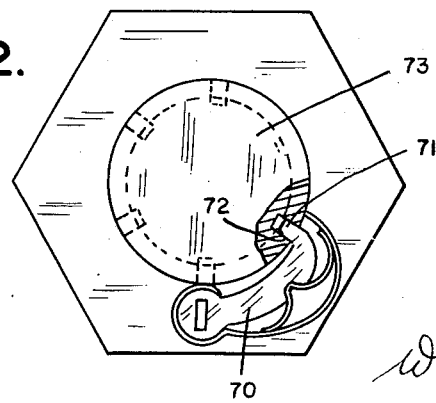
*INVENTOR.*
JAMES EDWARD DUGGAN
BY
ATTORNEYS Patented Apr. 3, 1945

2,372,889

UNITED STATES PATENT OFFICE 2,372,889

SELF-LOCKING NUT STRUCTURE

James Edward Duggan, Birmingham, Mich.

Application April 20, 1944, Serial No. 531,959

11 Claims. (Cl. 151—12)

This invention relates generally to self-locking nut structures and refers more particularly to those in which the nuts are provided with relatively movable means for engagement with the bolts to prevent the nuts from turning relative to the bolts.

One of the essential objects of the invention is to provide a nut structure of the type mentioned that eliminates the use of cotter pins and wire to keep the nut in locked position.

Another object is to provide a nut structure that effectively prevents the nut from becoming loose upon or backing off the bolt.

Another object is to provide a structure wherein the self-locking nut may be made from any standard nut, and any standard form of bolt may be modified to accommodate the same.

Another object is to provide a nut structure wherein the full locking power of the nut lock is obtained.

Another object is to provide a nut structure that is simple in construction, economical to manufacture and efficient in use.

Other objects, advantages and novel details of construction of this invention will be made more apparent as this description proceeds, especially when considered in connection with the accompanying drawings, wherein:

Figure 4 is a sectional view taken substantially on the line 4—4 of Figure 3, but omitting the bolt;

Figure 5 is a detail perspective view of the cover plate;

Figure 7 is an end view of the bolt illustrated in Figure 6;

Figure 10 is a view similar to Figure 3 but showing a slight modification;

Figure 11 is a fragmentary elevational view of the bolt illustrated in Figure 9;

Figure 12 is a view similar to Figure 3 but showing another modification.

Figure 3:
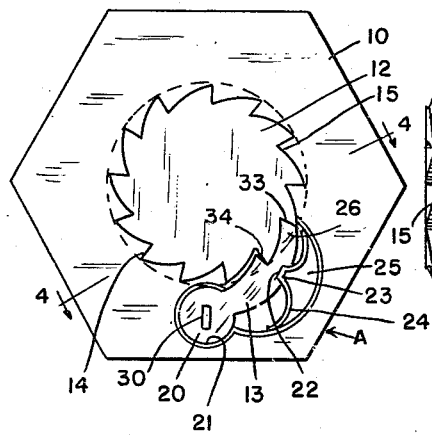
Figure 3 is a plan view of the nut structure applied to the bolt with the cover plate removed.
Figure 6:
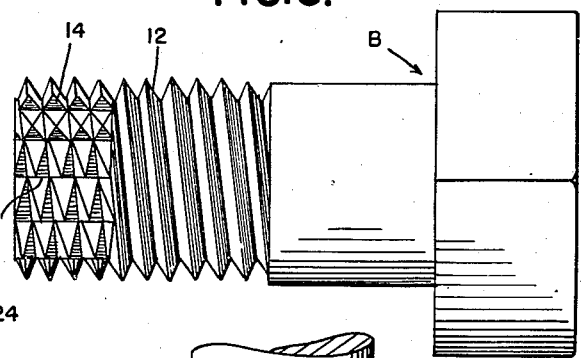
Figure 6 is an elevational view of the bolt to which the nut structure is applied.
Figure 1:
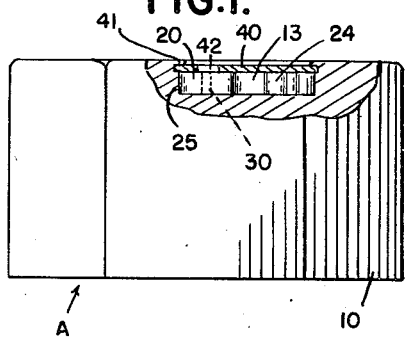
Figure 1 is an elevational view of a nut structure embodying my invention with parts broken away and in section.
Figure 8:
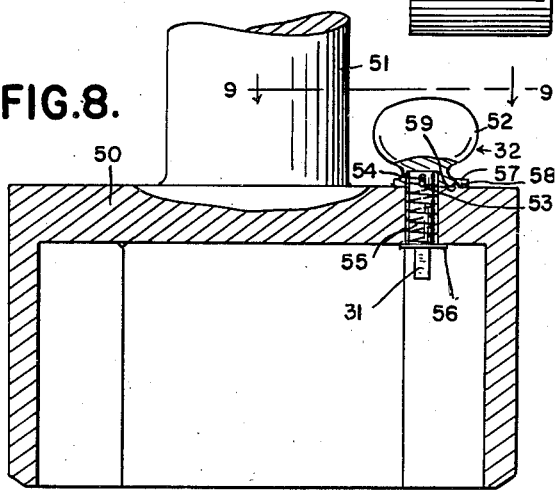
Figure 8 is a fragmentary sectional view through a socket wrench and showing an unlocking key for engagement with the pawl of the nut structure.
Figure 2:
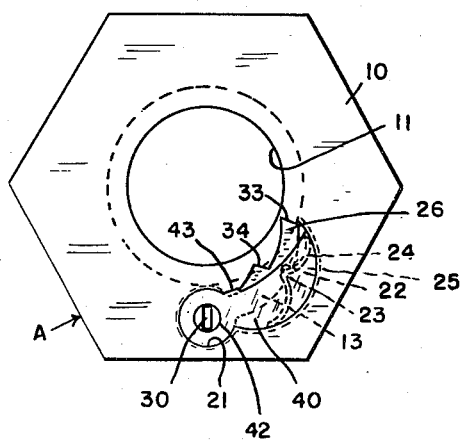
Figure 2 is a top plan view of the structure illustrated in Fig. 1.

Referring now to the drawings, A is a nut structure embodying my invention, and B is a bolt upon which the nut structure is adapted to be mounted.

As shown, the nut structure A comprises a polygonal body 10 having a centrally located interiorly threaded hole 11 for reception of the threaded shank 12 of the bolt, and having at one side of said hole a spring pressed pawl or dog 13 engageable with ratchet-like teeth 14 provided by circumferentially spaced longitudinally extending grooves or channels 15 in the threaded portion 12 of the bolt to prevent the nut from loosening up or backing off said bolt.

Preferably the pawl 13 has a rounded end portion 20 engaging a circular recess 21 in the body 10 of the nut and has a notch or recess 22 in its rear edge engageable by a detent 23 of a leaf spring 24 that is located within and terminally engages at spaced points the edges of a semicircular recess 25 in the body of the nut. Thus, the free end portion 26 of the pawl is constantly urged outward by the spring 24.

The recesses 21 and 25 connect into one another and may be formed by suitable drilling operations, or by any other method desired.

In the present instance the rounded end portion 20 of the pawl has a substantially rectangular recess or hole 30 therein for the reception of the shank 31 of an unlocking key 32, and the free end portion 26 of the pawl has two shoulders 33 and 34, respectively, arranged in tandem for engagement with the ratchet-like teeth 14 provided by the longitudinal grooves 15 in the bolt.

Preferably a plate 40 is disposed in the connecting recesses 21 and 25 and serves as a common cover for the pawl 13 and spring 24. Such plate 40 substantially conforms in shape to the connecting recesses 21 and 25 and is held fast by peened over edge portions 41 of the body of the nut. A circular hole 42 is provided in the cover plate 40 to receive the shank 31 of the unlocking key when it is engaged with the rectangular recess or hole 30 in the bolt, and a lug 43 is provided at the outer edge of said plate to limit outward swinging movement of the pawl.

In use the nut 10 may be applied in the usual manner to the threaded portion 12 of the bolt by simply turning the nut on the threaded portion until the nut is in the proper adjusted or tightened position. During this turning movement of the nut the free end portion 26 of the pawl 13 will merely ride over the ratchet-like teeth 14 of the bolt. However, when the nut reaches the desired tightened position the engagement of the pawl 13 with the ratchet-like teeth 14 of the bolt, as illustrated in Figure 3, will effectively prevent the nut from loosening up or backing off the bolt. Thus, the nut will be automatically locked in its adjusted position by the engagement of the spring pressed pawl 13 with ratchet-like teeth 14. The unlocking key 32 for the pawl is preferably carried by the head 50 of a suitable socket wrench 51 and may be any suitable construction. Preferably such key 32 is provided on top of the head 50 of the socket wrench with a finger piece 52 by which the shank 31 may be manipulated. A pin 53 and slot 54 connection is provided between the finger piece and shank, and a coil spring 55 is sleeved on the shank 31 between a flange 56 thereof on the underside of the head 50 and said pin and slot connection. For holding the key 32 in various adjusted positions the finger piece 52 has a lateral projection 57 provided with one or more recesses 58 for receiving spaced detents 59 on top of the head 50. Thus, when the finger piece 52 is turned the shank 31 will be correspondingly turned and the engagement of the lateral projection 57 with the detent 59 during such turning movement will maintain the parts in adjusted position. As a result the pawl 13 may be moved by the shank 31 of the key from the operative latching position illustrated in Figure 3 to an inoperative unlatched position when the key is turned as aforesaid and may be held in such inoperative position by engagement of the key with one of the detents 59 to permit free movement of the nut 10 relative to the bolt.

Figure 9:
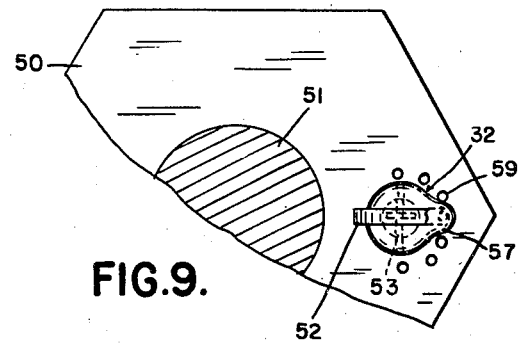
Figure 9 is a sectional view on the line 9—9 of Figure 8.

In Figures 9 and 10 I have illustrated a slight modification wherein the pawl 60 of the nut structure is shaped to engage recessed portions 61 of the bolt between longitudinally extending threaded splines or ribs 62 thereof to permit relative movement between the nut and bolt.

In Figure 11 I have illustrated another modification wherein the pawl 70 of the nut structure has an arm or projection 71 engageable with one of a series of sockets 72 spaced circumferentially in the bolt 73 to prevent relative movement between the nut and bolt.

Thus, in each instance the nut is effectively prevented from working loose or backing off the bolt when in locked position.

What I claim as my invention is:

1. A nut structure comprising a nut having a polygonal body provided with a threaded opening for the reception of a threaded portion of a bolt, and a pawl pivotally connected to the body and having a portion movable into said opening for interlocking engagement with the threaded portion of the bolt, said pawl having a recess for the reception of an unlocking key by which the portion of the pawl may be moved from interlocking engagement with the bolt.

2. A nut structure comprising a nut having a polygonal body provided with a threaded opening for the reception of a threaded portion of a bolt, a pawl pivotally connected to the body and having an end portion movable into said opening for interlocking engagement with the threaded portion of the bolt, said pawl having a recess for the reception of an unlocking key by which the end portion aforesaid of the pawl may be moved from interlocking engagement with the bolt, a spring carried by the body for urging the portion of the pawl into the opening for interlocking engagement with the bolt, and a cover plate for the pawl and spring carried by and rigid with the body, said cover plate being provided in registration with said recess with an opening through which the unlocking key aforesaid may be inserted for engagement with said recess.

3. A nut structure comprising a nut having a polygonal body provided with an opening for the reception of a bolt, a pawl pivotally connected to the body and having an end portion movable into said opening for interlocking engagement with the bolt, said pawl having a recess for the reception of an unlocking key by which the end portion aforesaid of the pawl may be moved from interlocking engagement with the bolt, means carried by the body for urging the portion of the pawl into the opening for interlocking engagement with the bolt, and a cover plate for the pawl and means carried by the body and provided in registration with said recess with an opening through which the unlocking key aforesaid may be inserted for engagement with said recess.

4. A nut structure comprising a nut having a polygonal body provided with a threaded opening for the reception of a threaded portion of a bolt, a pawl pivotally connected to the body and having an end portion movable into said opening for interlocking engagement with the threaded portion of the bolt, said pawl having a recess for the reception of an unlocking key by which the end portion aforesaid of the pawl may be moved from interlocking engagement with the bolt, a spring carried by the body for urging the portion of the pawl into the opening for interlocking engagement with the bolt, a cover plate for the pawl and spring carried by and rigid with the body, said cover plate being provided in registration with said recess with an opening through which the unlocking key aforesaid may be inserted for engagement with said recess, and a lug projecting from the cover plate and engageable by said pawl to limit movement of the end portion thereof into the opening in the body of the nut.

5. A nut structure comprising a nut having a polygonal body provided with an opening for the reception of a bolt, a pawl pivotally connected to the body and having an end portion movable into said opening for interlocking engagement with the bolt, said pawl having a recess for the reception of an unlocking key by which the end portion aforesaid of the pawl may be moved from interlocking engagement with the bolt, means carried by the body for urging the portion of the pawl into the opening for interlocking engagement with the bolt, and a cover plate for the pawl and spring carried by the body and provided in registration with said recess with an opening through which the unlocking key aforesaid may be inserted for engagement with said recess, said cover plate also having a rigid part in the path of and engageable by the pawl to limit movement of the end portion thereof into the opening in the body of the nut.

6. A nut structure comprising a nut having a polygonal body provided with a threaded opening for the reception of a threaded portion of a bolt, and provided in one face thereof at one side of said opening with two connecting recesses, one of said recesses being substantially circular, the other of said recesses being substantially semicircular in configuration and opening into the threaded opening, a pawl within said connecting recesses, one end portion of said pawl being rounded and pivotally engaging said circular recess, the other end portion of said pawl being elongated and disposed within the semi-circular recess, said elongated end portion being movable from the semi-circular recess into the threaded opening of said body for interlocking engagement with a threaded portion of a bolt, a spring in the semi-circular recess engaging said elongated end portion of the pawl and urging the same into the threaded opening of the body, the rounded end portion of said pawl having a recess for the reception of an unlocking key by which the elongated portion of the pawl may be moved from interlocking engagement with the bolt, and a cover plate for said pawl and spring located within said connecting recesses and rigid with the body of said nut, said cover plate being provided in registration with said recess with an opening through which the unlocking key aforesaid may be inserted for engagement with said recess.

7. A nut structure comprising a nut having a polygonal body provided with an opening for the reception of a bolt, a pawl within said polygonal body, one end portion of said pawl being pivotally connected to said body, the other end portion of said pawl being elongated and movable into the opening of said body for interlocking engagement with a bolt, a spring in the polygonal body engaging said elongated end portion of the pawl and urging the same into the opening of the body, the pivoted end portion of said pawl having a recess for the reception of an unlocking key by which the elongated portion of the pawl may be moved from interlocking engagement with the bolt, and a cover plate for said pawl and spring located within said polygonal body and rigid therewith, said cover plate being provided in registration with said recess with an opening through which the unlocking key aforesaid may be inserted for engagement with said recess.

8. A nut structure comprising a nut having a polygonal body provided with a threaded opening for the reception of a threaded portion of a bolt, means for preventing the nut from loosening up or backing off the bolt when tightened thereon, including a pivoted element within the body having a portion movable into the threaded opening for interlocking engagement with the threaded portion of the bolt, a spring within the body for urging said portion into said interlocking engagement, and a cover for both the pawl and spring fixed to the body of the nut and having a rigid part engageable by the pivoted element for limiting movement of said portion into said threaded opening.

9. A nut structure comprising a nut having a polygonal body provided with a threaded opening for the reception of a threaded portion of a bolt, a pawl pivotally connected to the body and having a portion movable into said opening for interlocking engagement with the threaded portion of the bolt, said pawl having a recess for the reception of an unlocking key by which the portion aforesaid of the pawl may be moved from interlocking engagement with the bolt, yieldable means carried by the body for urging the portion aforesaid of the pawl into the opening for interlocking engagement with the bolt, and means rigid with the body and engageable with the pawl to limit movement of said portion into said opening.

10. A nut structure comprising a nut having a polygonal body provided with a threaded opening for the reception of a threaded portion of a bolt, and provided in one face thereof at one side of said opening with two connecting recesses, one of said recesses being substantially circular, the other of said recesses being substantially semi-circular in configuration and opening into the threaded opening, a pawl within said connecting recesses, one end portion of said pawl being rounded and pivotally engaging said circular recess, the other end portion of said pawl being elongated and disposed within the semi-circular recess, said elongated end portion being movable from the semi-circular recess into the threaded opening of said body for interlocking engagement with a threaded portion of a bolt, a spring in the semi-circular recess engaging said elongated end portion of the pawl and urging the same into the threaded opening of the body, the rounded end portion of said pawl having a recess for the reception of an unlocking key by which the elongated portion of the pawl may be moved from interlocking engagement with the bolt.

11. A nut structure comprising a nut having a polygonal body provided with a threaded opening for the reception of a threaded portion of a bolt, means carried by the body of the nut and movable relative thereto into said threaded opening for interlocking engagement with the threaded portion of the bolt to prevent the nut from loosening up or backing off the bolt when tightened thereon, said movable means having a recess for the reception of an unlocking key by which the movable means may be moved from interlocking engagement with the bolt, and cover means for the movable means carried by said polygonal body and having a rigid part in the path of and engageable by the movable means aforesaid for limiting movement of the movable means into said threaded opening, said cover means being provided in registration with said recess with an opening through which the unlocking key aforesaid may be inserted for engagement with the recess in said movable means.

JAMES EDWARD DUGGAN.